United States Patent
Buena, II (10) Patent No.: US 11,373,506 B1
(45) Date of Patent: Jun. 28, 2022

(54) INDEPENDENT SECURITY MONITORING DEVICE AND PROCESS FOR MONITORING INFRASTRUCTURE SYSTEMS BY WAY OF AN ARTIFICIAL INTELLIGENCE AND SENSOR-BASED LOCATION-INDEPENDENT DEVICE

(71) Applicant: Luis Baradas Buena, II, Huntington Beach, CA (US)

(72) Inventor: Luis Baradas Buena, II, Huntington Beach, CA (US)

( * ) Notice: Subject to any disclaimer, the term of this patent is extended or adjusted under 35 U.S.C. 154(b) by 0 days.

(21) Appl. No.: 17/196,602

(22) Filed: Mar. 9, 2021

Related U.S. Application Data (60) Provisional application No. 62/958,857, filed on Jan. 9, 2020.

(51) Int. Cl.
| | | |
|---|---|---|
| *G08B 17/00* | (2006.01) | |
| *G08B 21/18* | (2006.01) | |
| *H04W 4/70* | (2018.01) | |
| *H04W 4/029* | (2018.01) | |
| *H04L 43/0817* | (2022.01) | |

(52) U.S. Cl.
CPC ........ *G08B 21/182* (2013.01); *H04L 43/0817* (2013.01); *H04W 4/029* (2018.02); *H04W 4/70* (2018.02)

(58) Field of Classification Search
CPC ...... G08B 21/182; H04W 4/70; H04W 4/029; H04L 43/0817
USPC ....................................................... 340/584
See application file for complete search history.

(56) References Cited

U.S. PATENT DOCUMENTS

| | | | | |
|---|---|---|---|---|
| 8,195,340 B1* | 6/2012 | Haney | ................... | G06F 11/143 713/340 |
| 8,812,881 B1* | 8/2014 | Heath | ................. | G06F 11/2015 713/300 |
| 9,516,067 B2* | 12/2016 | Layman | .............. | H04L 41/0663 |
| 2010/0034370 A1* | 2/2010 | Rawlins | .............. | H04Q 3/0079 379/221.03 |
| 2012/0109545 A1* | 5/2012 | Meynardi | ........... | H02J 13/0006 702/58 |
| 2013/0051326 A1* | 2/2013 | Jeyatharan | ............ | H04L 47/805 370/328 |
| 2015/0119065 A1* | 4/2015 | Shaw | .................... | H04W 64/00 455/456.1 |
| 2015/0186677 A1* | 7/2015 | Sankar | .................... | H04L 63/10 726/34 |
| 2016/0018458 A1* | 1/2016 | Basu | ..................... | G01R 31/088 702/59 |
| 2016/0164721 A1* | 6/2016 | Zhang | ................... | H04L 41/142 709/224 |
| 2016/0218971 A1* | 7/2016 | Basunov | ................. | H04L 45/04 |
| 2017/0054615 A1* | 2/2017 | Wilson | ................ | H04L 43/0817 |
| 2017/0104775 A1* | 4/2017 | Vasseur | ............... | H04L 43/0876 |
| 2017/0223599 A1* | 8/2017 | Ho | ......................... | H04W 4/14 |
| 2018/0024205 A1* | 1/2018 | Kim | .................. | H02J 13/00006 700/293 |
| 2018/0352310 A1* | 12/2018 | Bonicatto | ................ | H04Q 9/02 |
| 2020/0097060 A1* | 3/2020 | Hanna | ....................... | G06F 1/26 |

* cited by examiner

*Primary Examiner* — Zhen Y Wu
(74) *Attorney, Agent, or Firm* — Plager Schack LLP; Mark H. Plager; Stephen Hallberg (57) ABSTRACT

An independent security monitoring device (ISMD) that monitors infrastructure systems is disclosed. The ISMD provides alerts when sensors are activated. The ISMD can be configured for use according to specific ISO-compliant policy procedures.

10 Claims, 5 Drawing Sheets

INDEPENDENT SECURITY MONITORING DEVICE AND PROCESS FOR MONITORING INFRASTRUCTURE SYSTEMS BY WAY OF AN ARTIFICIAL INTELLIGENCE AND SENSOR-BASED LOCATION-INDEPENDENT DEVICE

CLAIM OF BENEFIT TO PRIOR APPLICATION

This application claims benefit to U.S. Provisional Patent Application 62/958,857, entitled "Independent Security Monitoring Device (ISMD)," filed Jan. 9, 2020. The U.S. Provisional Patent Application 62/958,857 is incorporated herein by reference.

BACKGROUND

Embodiments of the invention described in this specification relate generally to systems security monitoring, and more particularly, to an independent security monitoring device (ISMD) and an independent security monitoring process for monitoring infrastructure systems by way of an artificial intelligence (AI) and sensor-based location-independent device.

Electronic devices and infrastructure systems are used by many people and organizations. There is substantial risk of theft, tampering, data center/server failures, or other problems when such electronic devices and/or infrastructure systems are physically installed and monitored via existing monitoring systems. Most of the existing monitoring systems and devices are installed at a centralized location. Centralized monitoring systems do not work well because they typically provide late responses to data center personnel. Physical key locks does not prevent thieves from stealing hardware or data. Physical access by way of network connection to the switch is not known until physical inspection is done. This is a problem for information technology (IT) administrators, owners, or other appropriate personnel who have no way of knowing who had physical access to the electronic devices and infrastructure systems inside computer rack(s)/cabinet(s) or wherever they may be located.

Furthermore, IT administrators and other relevant personnel also have problems preventing other problems that affect the electronic devices and/or infrastructure systems of their organizations. In the conventional monitoring systems that exist today, temperature and humidity, earthquake and other vibrations, cabinet loss of power, loss of network connectivity, etc., have no real-time identification of the problem within the rack(s)/cabinet(s) or wherever located.

Therefore, what is needed is a way to monitor infrastructure devices and systems by in a location-independent manner, to continuously check the status of sensors for temperature and humidity, earthquake and other vibrations, loss of power, loss of network connectivity, and other such relevant environmental and security readings, and to communicate troubling sensor readings or detected security conditions to appropriate personnel.

BRIEF DESCRIPTION

A novel independent security monitoring device (ISMD) and a novel independent security monitoring process for monitoring infrastructure systems by way of an artificial intelligence (AI) and sensor-based location-independent device are disclosed. In some embodiments, the ISMD and the independent security monitoring process for monitoring infrastructure systems by way of an AI and sensor-based location-independent device monitor environmental and security sensors and, based on sensor various readings, deliver messages to an authorized user in a few seconds. The authorized user can be an owner, an information technology (IT) administrator, or other relevant IT personnel. The content of each message delivered to the user(s) corresponds to sensor readings that deviate beyond an acceptable difference from their normal default values. Messages are normally delivered as digital communications (email, text, etc.) via the Internet. However, the ISMD and the independent security monitoring process for monitoring infrastructure systems by way of an AI and sensor-based location-independent device support an alternate path network (APN) processing model which, in the absence of the Internet (or its normal network connection), the mobile wireless communications are utilized by the ISMD. The ISMD is able to actively switch from normal network communications (Internet) to mobile wireless communications because the ISMD has a built-in LTE wireless communication module or other such mobile wireless technology that can take over message delivery systems seamlessly.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments include an independent security monitoring device (ISMD) and an independent security monitoring process for monitoring infrastructure systems by way of an artificial intelligence (AI) and sensor-based location-independent device. In some embodiments, the independent security monitoring device (ISMD) is built on a single chassis with either one or multiple single board computer(s) that run an independent security monitoring software program as a continuous engine for monitoring environmental and security sensors. When sensor readings are out of a normal range, the ISMD nearly immediately (within a few seconds) delivers messages to specific users to alert them of the high or low sensor readings. The content of each message corresponds to sensor thresholds either above or below their normal default values. The default and normal delivery mechanism is network connection via the Internet. In the absence of the Internet, the ISMD has a built-in LTE or wireless technology that can take over message delivery systems seamlessly.

In some embodiments, the independent security monitoring process for monitoring infrastructure systems by way of an AI and sensor-based location-independent device is implemented as the independent security monitoring software program that continuously runs on a single board computer that is configured as a primary ISMD server on the independent security monitoring device.

As stated above, electronic devices and infrastructure systems are routinely used by organizations, people, etc., yet there remains substantial risk of theft, tampering, data center/server failures, or other problems when such electronic devices and/or infrastructure systems are physically installed and monitored via existing monitoring systems. Most of the existing monitoring systems and devices are installed at a centralized location, which typically provide late responses to data center personnel, and do not address other security concerns, namely, the risk of hardware and/or data theft (not prevented by physical key locks) and physical access by way of network connection to the switch is not known until physical inspection is done. Furthermore, the conventional monitoring systems that exist today are ineffective in some ways with regards to temperature and humidity, earthquake and other vibrations, cabinet loss of power, loss of network connectivity, etc., because they lack a way to perform real-time identification of the problem and the hardware/data involved. Embodiments of the ISMD and the independent security monitoring process for monitoring infrastructure systems by way of an AI and sensor-based location-independent device described in this specification solve such problems by implementation of an independent security monitoring software program that runs on a primary ISMD server of the ISMD and activates each on/off physical sensor to the door and sends a digital communication (such as an email, a text message, or another similar form of communication) to the IT Administrators in a matter of a few seconds while capturing a few seconds of video recording at the same time for follow-up notification alerting and to document the situation. The ISMD and the independent security monitoring process for monitoring infrastructure systems by way of an AI and sensor-based location-independent device also solves any ISO-compliant related policy within an organization.

In some embodiments, the ISMD is capable of handling behind the scenes troubleshooting techniques from a different perspective, in the sense of "looking from the inside of the network to outside" and from "outside the network to the inside." In other words, the ISMD places someone else's diagnosing techniques on both sides of the perimeter, which is both simple and effective.

In some embodiments, the primary ISMD server runs a Linux operating system (OS). In some embodiments, the independent security monitoring software program runs on the Linux OS of the primary ISMD server which prevents unauthorized users from accessing any connected resources. Specifically, the Linux OS is configured on the primary ISMD server to prevent end-users and all unauthorized operators from accessing local folders & files.

In some embodiments, the independent security monitoring software program runs as an automated, continuous program. In some embodiments, the automation defines certain rules of individual functions and also counter-checks the health status of the entire ISMD system. This is accomplished by having sufficient on-the-grid power, a built-in mini-UPS, local and wireless area networks, an alternate path network (APN), and local resources such as CPU and Memory. Specifically, some embodiments of the ISMD include an alternate path network (APN) module, an LTE mobile wireless communication module, and a GPS receiver. In some embodiments, the APN module is built based on a system-on-chip (SoC) architecture that seamlessly interacts with a central processing unit of the primary ISMD server and any other processing unit of any other single board computer system encapsulated in the ISMD.

Embodiments of the ISMD and the independent security monitoring process for monitoring infrastructure systems by way of an AI and sensor-based location-independent device described in this specification differ from and improve upon currently existing monitoring systems that are centralized and location-specific (or dependent on location of installation). In some embodiments, the ISMD is individually installed in a rack/cabinet with cameras and sensors located in front and back. Given that inside crime jobs (by actual authorized users, or other insiders with access to authorization) are hard to track and when IT infrastructure is improperly stolen, altered, reconfigured, etc., the investigation that ensues is typically lengthy in nature. However, with front camera, door sensor(s), location-awareness (via detection of changed location through GPS, or wireless triangulation when not visible to satellites, such as indoors), and the ability to alert responsible IT personnel of the problem via standard network-based email and other digital communication, or when the network is not available, via cellular or other mobile wireless LTE communications, the chances of catching a problem are dramatically increased.

Also, while the ISMD installation relates to a specific location, the ISMD is location-independent by way of an alternate path network (APN) component that identifies alternate communication options when a default network at installation site is absent, and which works in connection with a global positioning system (GPS) to calculate latitude and longitude coordinates based on location information provided by satellites and received at a GPS receiver of the ISMD. In some embodiments, the ISMD uses the location information and calculated coordinates to detect movements of the ISMD away from its installation location in the rack/cabinet. When the ISMD detects movement of the device away from its installation location and determines that the default network is absent (not connected for Ethernet connections, not within range for WiFi connections), the APN is triggered in the ISMD to identify an alternative communication method. In some embodiments, an LTE wireless communication module is installed in the ISMD and the APN is configured to communicate via the LTE wireless communication module when the network is absent. In this way, the ISMD is location-independent and able to send notifications to the appropriate personnel in IT whenever it is physically moved or removed from the default network.

In addition, embodiments of the ISMD and the independent security monitoring process for monitoring infrastructure systems by way of an AI and sensor-based location-independent device improve upon the currently existing monitoring systems and other conventional options by providing specific documentation to end-users (data center space renters, IT admins, other relevant personnel), which can be used as specific ISO-compliant policy procedures.

The independent security monitoring device (ISMD) of the present disclosure may be comprised of the following elements. This list of possible constituent elements is intended to be exemplary only and it is not intended that this list be used to limit the ISMD of the present application to just these elements. Persons having ordinary skill in the art relevant to the present disclosure may understand there to be equivalent elements that may be substituted within the present disclosure without changing the essential function or operation of the ISMD.

1. One or more security sensors
2. A camera
3. Environmental sensors comprising at least a temperature/humidity sensor, a door sensor, and a vibrations sensor.
4. One or more power sensors
5. One or more network sensors
6. An uninterruptible power supply (UPS) with sensor (UPS and sensor are built-in or encapsulated within the ISMD)
7. An alternate path network (APN) system-on-chip (SoC) module
8. A GPS receiver to calculate location based on location data provided by three or more GPS satellites (for Latitude and Longitude location for tracking of the ISMD)
9. One or more ISMD servers comprising at least a primary ISMD server (single board computer)
10. An independent security monitoring software program (as an implementation of the independent security monitoring process for monitoring infrastructure systems by way of an AI and sensor-based location-independent device), which includes alerting and notification via network communication, alternate alerting & notification via SMS and email triggered by APN detecting of absent network, movement from default deployment location, or lack of power
11. A troubleshooting tool
12. Compliance for ISO/GDPR/CCPA/HIPAA/CMMC (Cybersecurity Maturity Model Certification)
13. Graphical Display for Power Distribution Unit (PDU) Usage
14. System Log & Sensor Log record tracking
15. Monitored servers (e.g., file servers, database management system server and associated database(s), web servers, application servers, etc.) and/or LAN Internet devices (monitored servers and LAN Internet devices configured for monitoring by the ISMD)

In some embodiments, each ISMD server comprises a Raspberry Pi single-board computer with a camera. For example, the Raspberry Pi Model 4B can be adapted to include the camera, as well as sensors, including, without limitation, a door sensor, a temperature/humidity sensor, a vibration sensor, and other such sensor hardware. In some embodiments, at least one ISMD server comprises a Raspberry Pi single-board computer of a particular model and another ISMD server comprises a different model of Raspberry Pi single-board computer. Operating system (OS) software installed on the ISMD server. In at least one embodiment, the OS software comprises Linux. However, the OS software can be any OS software that provides at least the following services: (i) web Interface with landing page, (ii) SMTP server for send-only digital communications, (iii) sub-routine programs for door, temp/humidity, vibration and camera program loops, (iv) extra storage mounted and added for longer data retention, (v) security protection on end-user login and password challenge, storage access, and program compiler, and (vi) miscellaneous house-keeping utilities.

The ISMD and the independent security monitoring process for monitoring infrastructure systems by way of an AI and sensor-based location-independent device of the present disclosure generally works with each hardware component (sensors) having an initial value. The initial value can be based on an end user's input, a pre-configured setting, or other initial value setting. The independent security monitoring software program will inspect and compare that original value of + or − result(s) within specified time allocated then make a decision either to send or not to send the alert for the recipient's email, mobile phone device, or similar communication alerting devices. In addition, the flow of the independent security monitoring software program verifies the retention period of stored data to avoid running out of storage space.

Figure 1:
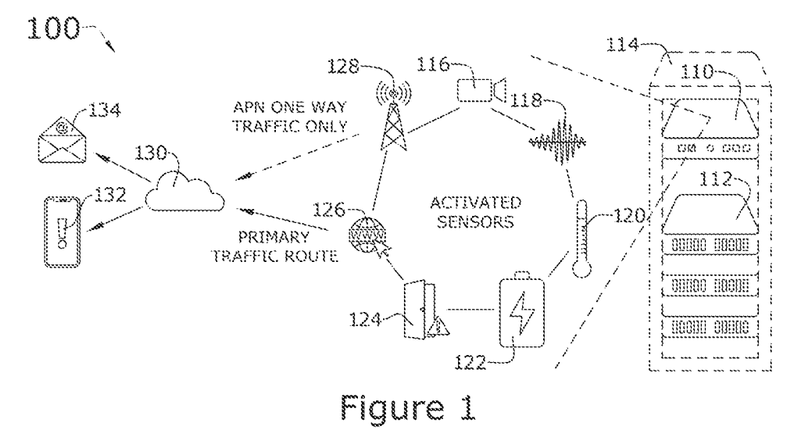
FIG. 1 conceptually illustrates an independent security monitoring device (ISMD) in some embodiments deployed and activated for use in a data center cabinet.

By way of example, FIG. 1 conceptually illustrates an independent security monitoring device (ISMD) deployed and activated for use in a data center cabinet 100. As shown, an independent security monitoring device (ISMD) 110 is rack mounted in a single (1U) rack slot of a server cabinet 114 which also supports other hardware computing devices and servers, specifically, one or more monitored servers 112. Several components are encapsulated within or connected directly to the ISMD 110 including a camera 116, a vibration/earthquake sensor 118, a temperature/humidity sensor 120, and a power sensor 122. External sensors are also shown, including a door sensor 124 and a network (Internet) sensor 126. An LTE wireless communication module 128 is also included within the ISMD 110 and, in some embodiments, is included in a system-on-chip (SoC) alternate path network (APN) hardware module (not shown in this figure). The APN is triggered for one way communication traffic via the LTE wireless communication module 128 when a primary data traffic route through the network sensor 126 is detected as missing. This way, when a security or environmental concern arises, an SMS text message 132 can be sent as a mobile device notification to the IT administrator or other authorized personnel and/or an email notification 134 can be sent to the same. For example, when the door sensor 124 detects that a door opens, the ISMD 110 receives the sensor data and triggers the camera 116 to capture a short video of the area, while simultaneously preparing an alert notification to send to the IT administrator as either or both of the SMS text message 132 and/or email notification 134. The normal path for sending the SMS text message 132 and email notification 134 would be through the primary traffic route, which is over the network (Internet 130). However, if the network (Internet 130) is not detected, then the SMS text message 132 and email notification 134 will still be sent to the IT administrator because the APN will detect that an alternate path network needs to be activated over the LTE wireless communication module 128. As long as the ISMD 110 is within range of a wireless communication tower, the SMS text message 132 and email notification 134 will be sent to the IT administrator.

While the example above focuses on a door opening scenario, the sensor trigger may be based on other sensor data that is detected as being out of the normal range. Thus, if power is determined to be a problem (and backup power UPS is triggered to keep the ISMD 110 running), or if temperature or humidity increases beyond a threshold acceptable high level (or decreases below a threshold low level), or if seismic vibrations are detected, or vibrations caused by a thief trying to dislodge any of the monitored servers 112, the camera 116 can then be activated by the ISMD 110 to capture a short video and also send out the notifications (text and email) to the IT administrator (or other authorized user). In addition, while the temperature/humidity sensor 120 provides an example of an environmental sensor, many other types of environmental sensors are supported by the ISMD 110 and operate in expected ways for their type (meaning, sensor readings are captured and when the sensor data is outside of a normal acceptable range, notifications are triggered accordingly). Further details of environmental sensors, the door sensor, and all sensors are described below, by reference to FIG. 4.

Figure 2:
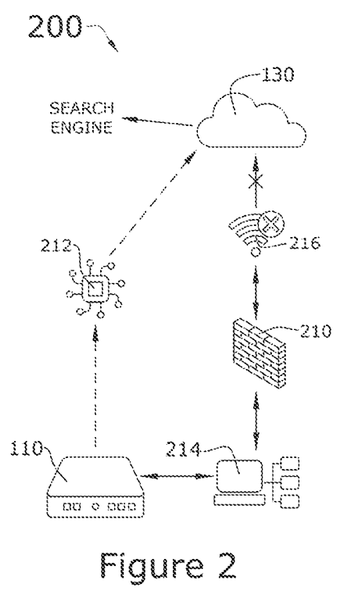
FIG. 2 conceptually illustrates network failure activation of an alternate path network (APN) module of the ISMD in some embodiments.

Now turning to another example, FIG. 2 conceptually illustrates network failure activation 200 of an alternate path network (APN) module of the ISMD in some embodiments. As shown in this figure, the ISMD 110 is configured to communicate along a primary traffic route that starts at the ISMD 110 through a LAN switch 214 and firewall 210 in the local network. However, when an Internet outage 216 is detected, the primary traffic route through the Internet 130 is not available. Under that scenario, the ISMD 110 identifies the APN one way traffic via an alternate path network (APN) with integrated cellular and GPS 212. This reconnects through one way APN traffic to the Internet 130. Then notifications can be sent via SMS text messages and/or email to the IT administrator with information about the Internet outage and/or other ongoing concerns or IT infrastructure problems.

Figure 3:
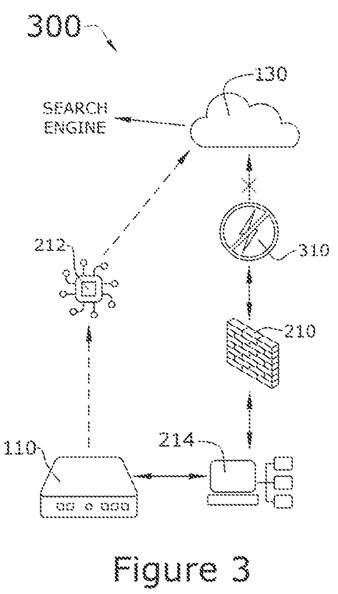
FIG. 3 conceptually illustrates power failure activation of the APN module of the ISMD in some embodiments.

Similarly, FIG. 3 conceptually illustrates power failure activation 300 of the APN module of the ISMD in some embodiments. As shown here, when a power outage 310 is detected, the ISMD 110 identifies the APN one way traffic via the APN with integrated cellular and GPS 212, thereby opening data traffic over LTE cellular communication to the Internet 130 and beyond.

Figure 4:
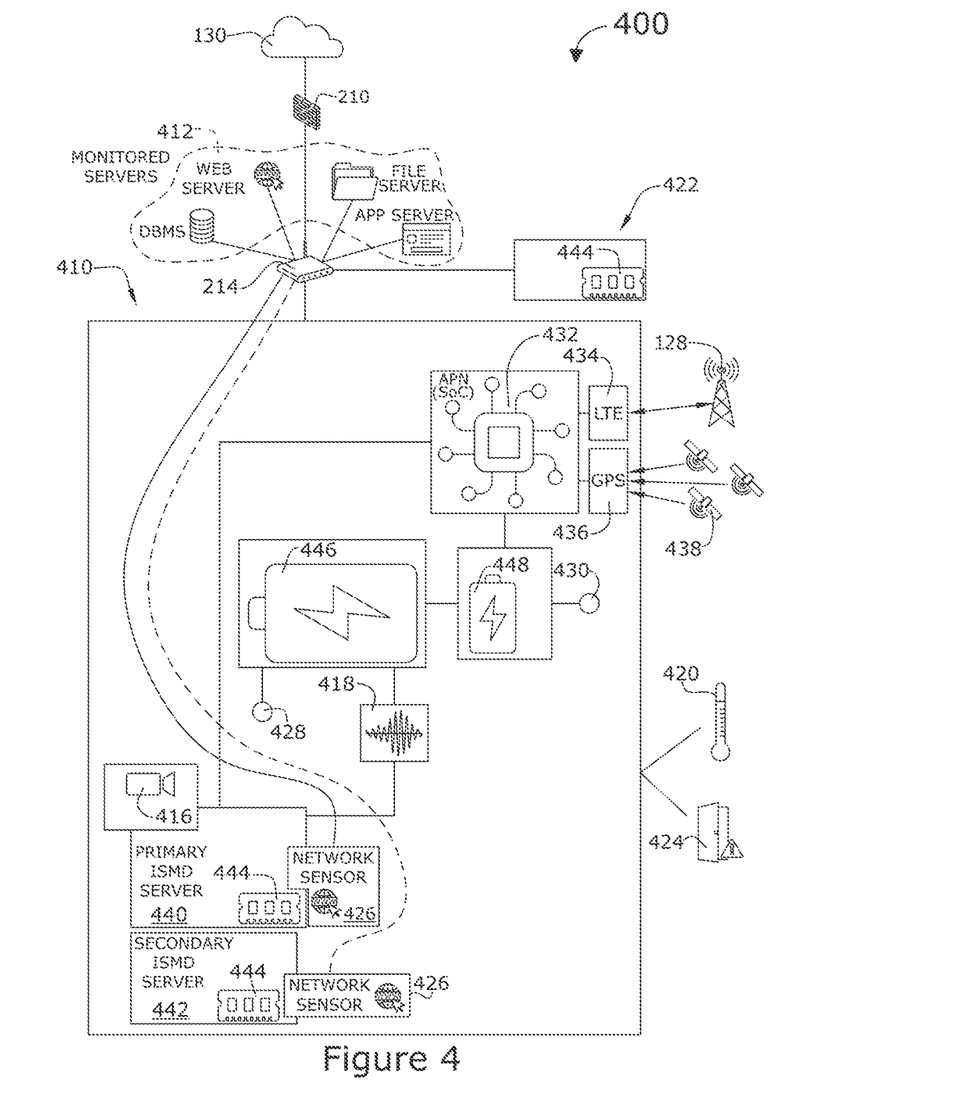
FIG. 4 conceptually illustrates a block diagram of an independent security monitoring device (ISMD) in some embodiments.

By way of example, FIG. 4 conceptually illustrates a block diagram 400 of an independent security monitoring device (ISMD) in some embodiments. Shown in this figure is an independent security monitoring device (ISMD) 410 with several integrated components and external sensors, a second ISMD 422 deployed at a local network site connected to a LAN switch to which the ISMD 410 connects to monitor several monitored servers 412 within the network, as shown inside the firewall 210 through which the Internet 130 is accessible.

In this figure, the several monitored servers 412 include a database management system server and associated database, a web server, a file server, and an application server. While the several monitored servers 412 are shown in this figure, several other servers may be monitored. Therefore, the several monitored servers 412 shown here are not intended to be limiting, but are demonstrative of the various data center monitoring which the ISMD 410 can be configured to conduct. In some embodiments, the ISMD supports configuration of any electronic device within a Local Area Network (LAN) as a monitored server is when the electronic device has at least a hardware address and a network address. In some embodiments, the hardware address comprises a MAC address. In some embodiments, the network address comprises an IP address.

Also, this figure demonstrates a secondary ISMD 422 which includes an onboard storage device 444. Although shown onboard, the storage device 444 may be an external storage disk or device that connects to a data port of the ISMD 410. In some embodiments, multiple independent security monitoring devices are deployed for large network and resource monitoring needs of an organization. Again, this representation is intended as exemplary and not limiting.

Turning to the ISMD 410, as shown in this figure, the several integrated components include a camera 416, a vibration/earthquake sensor 418, a primary power adapter 428, a secondary power adapter 430 an alternate path network (APN) module 432, an LTE wireless communication module 434, a GPS receiver 436, a primary ISMD server 440, a secondary ISMD server 442, network sensors 426, local storage devices 444, an uninterruptible power supply (UPS) with primary power sensor 446, a secondary power sensor 448. A door sensor 424 and a temperature/humidity sensor 420 are externally located outside the ISMD 410. However, the door sensor 424 and the temperature/humidity sensor 420 are communicably connected to the ISMD 410. Similarly, a communications tower 128 is shown outside of the ISMD 410 as well as several satellites 438 of a global positioning system from which the GPS receiver 436 is configured to receive location data that allows a triangulated calculation of a current position of the ISMD 410 to be determined in latitude and longitude, Cartesian coordinates, or geospatial coordinates associated with another geographic coordinate system. Further details of the sensors and other components are described below.

The camera 416 in this example is directly attached to the primary ISMD server 440. In some embodiments, the primary ISMD server 440 is internally attached to a housing of the ISMD 410 at a location in which the camera 416 is approximately flush with an exterior panel of the ISMD 410. In this way, a lens of the camera 416 is directed outward so that the camera 416 can capture video clips when triggered and activated. The video clips which the camera 416 captures are typically, but not always, short video clips of a few-several seconds in duration. In some scenarios, the camera 416 is configured to capture longer video clips. In some cases, the camera 416 is configured to capture one or more still images contemporaneously with capturing video. For example, a setting may trigger the camera 416 to capture a first still image at a first instance upon being triggered by the primary ISMD server 440, followed by capturing a short video clip, and then capturing another still image after the video clip is recorded. In some embodiments, the primary ISMD server 440 includes the local storage device 444 to store the video clips and any still images that are captured by the camera 416.

In addition to the primary ISMD server 440, the ISMD 410 shown in this figure includes the secondary ISMD server 442, which includes its own local storage device 444 and may also include a camera (not shown). In some embodiments, the secondary ISMD server 442 is used for processing in a parallel processing configuration with respect to the primary ISMD server 440. In this way, the combination of the primary ISMD server 440 and the secondary ISMD server 442 improves processing throughput. Both the primary ISMD server 440 and the secondary ISMD server 442 may be single board computers. As single board computers, such as Raspberry Pi computing devices, the servers may be configured as processing engines that allow the ISMD 410 to scale up the number of monitored servers and which may increase a number of possible security and environmental sensors that can be used by the ISMD 410. Also as shown, each ISMD server 440 and 442 includes a network sensor 426. The network sensor 426 may be an Ethernet port which, when connected to a local network and configured to connect to the Internet 130, provides a signal that is detected as normal network (Internet 130) connection. On the other hand, when no signal is detected by the network sensor 426, the alternate path network (APN) module 432 is configured to determine a secondary data traffic route, in connection with the LTE wireless communication module 434. Thus, when in range of a communication tower 128, an alternate communication path is established even when a network outage is detected (by the network sensor 426 of the primary ISMD server 440) for the local network or Internet 130. The GPS receiver 436 calculates latitude and longitude coordinates (or other such geospatial coordinates) based on location data received from three or more GPS satellites 438, thereby providing an effect means for detecting movement of the ISMD 410.

Also shown within the ISMD 410 are the primary power adapter 428 and the secondary power adapter 430 which provide continuous current/power by connection to, for example, a wall socket, a battery, a generator, or other source voltage or electrical current. Nevertheless, the ISMD 410 includes the UPS with primary power sensor 446 as a built-in component to seamlessly transfer power from battery when main power source voltage is not detected. The secondary power sensor 448 acts as a power source sensor only (not providing power to ISMD 410). Outside of ISMD 410, Primary and Secondary power source are used for power load balancing for all electronics. Thus, when a power outage is detected at a power source, AI will trigger an alert from either primary power sensor 446 and/or the secondary power sensor 448. The built-in UPS is directly connected to Primary power source 446 and utilized to provide power for the ISMD 410 and internal components, As noted above, the ISMD comes with security sensors, temperature/humidity sensors, vibration/earthquake sensors, power sensors, and a network sensor. In some embodiments, the security sensors include several such sensors and components that handle physical access scenarios, such as doors and other means of space access opening (like side panels, windows, floor access, etc.). The independent security monitoring software program includes an automated function that can be triggered or activated as a condition of a security sensor, such as during loss of magnetic and/or electrical contact. For example, someone opens a door at which the door sensor 424 is placed, such that when the door opens, a top part of the door sensor 424 that is disposed along a door frame remains in place while a bottom part of the door sensor 424, that is disposed along the swinging door, is physically moved away when the person opens the door, thereby triggering a condition for the door sensor 424. As a result of triggering a security sensor scenario, an 'alert' type notification is processed so that the sensor readings for the particular triggered security sensor are then converted into an alarm message that is given to the end-user in the form of SMS (short message services) or text message and email data. In some embodiments, sending text message and email data is an API function within the ISMD that also uses a SQL database (such as the DBMS and database from the monitored servers 412) which includes (1) the type of message, (2) the recipient's or recipients' wireless phone numbers, (3) the recipient's or recipients' email address(es), (4) the date of occurrence (date on which the security sensor was triggered as a result of sensor readings outside the normal range), (5) the time of occurrence (time of triggering), and (6) a brief description of the alert/alarm message. Once the condition is reversed, (1)-(6) of the SMS and email data is sent to the recipient's or recipients' wireless phone(s) and email address(es). This is categorized as "Sensor Log" in the SQL database, and is recorded every time.

In some embodiments, the camera 416 is directly connected to the primary ISMD server 440 (or other single board computer used as the primary runtime environment for the program) and is triggered by security sensors when door(s) loss of magnetic contact is/are active. The independent security monitoring software program automatically invokes procedural, process, and program calls for that function and activates the camera 416. Once active, the camera 416 captures a short video clip. For example, the camera 416 may record 5-10 seconds of live data once activated. The amount of time for the camera 416 to record the video is configurable, such that no limit is envisioned, and no minimum is too short—the camera 416 may even be configured to capture still images instead of recording video, or may capture one or more still images while also capturing a short live video upon activation (as triggered by the security sensor). Since live video data is captured in the form of multiple still pictures which are combined and converted into a single MP4 file, in some embodiments, one or more still images are extracted from the multiple still pictures, enhanced for clarity, and saved locally in association with the MP4 video file. The length of the MP4 file varies based on the end-user's discretion and the quality of video desired. Thus, a longer video can be captured when the conversion to MP4 is based on a lower bit rate in comparison to higher clarity in the MP4 at a higher bit rate, but resulting in typically shorter duration of recorded video. The individual still pictures are stored on the ISMD 410 in the local data storage 444, such as the local storage connected with the primary ISMD server 440 but alternately in the storage 444 onboard the secondary ISMD server 442. Furthermore, the individual still pictures can be imported into a larger capacity data storage device if needed. For example, it may be preferred to store enhanced imagery on a connected USB flash drive. Once the MP4 file is compiled it will be attached and sent to the end-user's email address for future viewing (that is the recipient or recipients, if more than one IT user is involved). In some embodiments, one set of recording per event is kept in local storage and overwritten each time to eliminate storage capacity issues.

In some embodiments, the environmental sensors are able to detect and read several ambient and environmental conditions. In particular, the temperature/humidity sensor 420 is able to detect and read temperature and humidity. In some embodiments, the temperature/humidity sensor 420 comprises a single sensor device that combines sensors for detecting ambient temperature and ambient humidity. In some other embodiments, the temperature/humidity sensor 420 comprise two separate sensors—a temperature sensor that detects ambient temperature and a separate humidity sensor that detects ambient humidity. Other environmental sensors may be configured to detect and read air pressure, motion, lighting, odor, smoke, chemicals, and other similar changes to normal conditions. Just like the security sensors, the independent security monitoring software program is a continuous, automated process that constantly 'listens' for any change in the default value either equal-to/less-than-to/greater-than-to conditions. The automated function of the independent security monitoring software program can be triggered or activated in the event that default values are altered. As a result, that is considered to be an 'alert' and is converted into an alarm message that is given to the end-user in the form of SMS and email data. Sending SMS and email data is an API function within the ISMD that also uses an SQL database which includes (1) the type of message, (2) the recipient's or recipients' wireless phone number(s), (3) the recipient's or recipients' email address(es), (4) the date of occurrence, (5) the time of occurrence, and (6) a brief description of the alert/alarm message. Once the condition is reversed, (1)-(6) of the SMS and email data is sent to the recipient's or recipients' wireless phone(s) and email address(es). This is categorized as "Sensor Log" in the SQL database, and is recorded every time.

In some embodiments, the power sensors (e.g., power sensor 122, UPS with primary power sensor 446, and secondary power sensor 448, or others) are a critical part of the ability for the ISMD to determine the presence and absence of the voltage and current within the environment. Multiple physical power sensors are equipped to constantly measure individual the PDU (Power Distribution Unit) in the allocated outlet for the ISMD. This automated function of the independent security monitoring software program can be triggered or activated when voltage drops down to zero ("0") volts or below default value(s), as configured. The ISMD can be connected to either 'smart' or 'non-smart' PDUs. The ISMD also activates an API to transfer power sources from the power grid to the built-in battery or UPS. As a result, that is considered to be an 'alert' and is converted into an alarm message that is given to the end-user in the form of SMS and email data. Sending SMS and email data is an API function within the ISMD that also uses an SQL database which includes (1) the type of message, (2) the recipient's or recipients' wireless phone number(s), (3) the recipient's or recipients' email address(es), (4) the date of occurrence, (5) the time of occurrence, and (6) a brief description of the alert/alarm message. Once the condition is reversed, (1)-(6) of the SMS and email data is sent to the recipient's or recipients' wireless phone(s) and email address(es). This is categorized as "Sensor Log" in the SQL database, and is recorded every time. In some embodiments, for the alternate path network (APN) to be activated, all power sensors have to be considered as 'loss' or 'no voltage'. In some embodiments, when only a single power sensor is triggered, but not all power sensors, the APN will not be activated.

In some embodiments, the network sensors 426 constantly send probes to multiple Local Area Network paths (Path A or Path B, such as via the LAN switch 214) which have network redundancies and Wide Area Network facing devices, similar to routers, layer3 switches, and/or firewalls. The probes continually will be reaching any SNMP equipped electronic devices by way of ICMP, SSH with credentials, and other similar relevant protocols to obtain both access and reply back results. In some embodiments, the ISMD's network sensors have to see that all of the device's conditions are true, or up, to keep the network considered as healthy. Redundant paths which are critical for ISMD's API are determined and based upon the end-user's input during initial setup. Network loss of any critical device such as switches (e.g., LAN switch 214), firewall (e.g., firewall 210), storage (e.g., storage 444), and physical host triggers an action that commands the ISMD to compose an alert message. As a result, the independent security monitoring software program running on the ISMD considers it to be an 'alert' which it converts into an alarm message that is given to the end-user in the form of SMS and email data. Sending SMS and email data is an API function within the ISMD that also uses an SQL database which includes (1) the type of message, (2) the recipient's or recipients' wireless phone number(s), (3) the recipient's or recipients' email address(es), (4) the date of occurrence, (5) the time of occurrence, and (6) a brief description of the alert/alarm message. The ISMD also activates the alternate path network (APN) API to handle the delivery of both SMS and email. Once the condition is reversed, (1)-(6) of the SMS and email data is sent to the recipient's or recipients' wireless phone(s) and email address(es) This is categorized as "Sensor Log" in the SQL database, and is recorded every time.

In some embodiments, the monitored servers and/or LAN Internet devices sensors provide a feature to monitor individual servers or other computing devices and read their current local resource usage, such as CPU, memory, network, fixes and patches, drivers, last updated driver, and other relevant maintenance operation tasks. Servers can be physical or virtual with a Windows or Linux Operating System. For critical IP address devices to be monitored they have to be included in the pre-defined hostname and IP addresses within the SQL database. A loss of the server's access or presence in the network is not considered to be normal conditions; an increase or decrease in the server's local resources or usage is considered to be an 'alert' and is converted into an alarm message that is given to the end-user in the form of text message and email data. Sending SMS and email data handled by the independent security monitoring software program via an API function call within the ISMD that also uses an SQL database which includes (1) the type of message, (2) the recipient's or recipients' wireless phone number(s), (3) the recipient's or recipients' email address(es), (4) the date of occurrence, (5) the time of occurrence, and (6) a brief description of the alert/alarm message. Once the condition is reversed, (1)-(6) of the SMS and email data is sent to the recipient's or recipients' wireless phone(s) and email address(es). This is categorized as "Sensor Log" in the SQL database, and is recorded every time. To eliminate or reduce resource consumption or resource overload, the primary ISMD server (appliance) may be accompanied by a secondary ISMD server (appliance), such as the primary ISMD server 440 and the secondary ISMD server 442 noted above. In this setup, the secondary ISMD server (appliance) may be configured to handle less intensive function handling monitored Windows/Linux servers. Also, any electronic device within the Local Area Network (LAN) with MAC Address and IP address can be considered/included as 'monitored server'.

In some embodiments, alerting and notification is performed by the independent security monitoring software program as a normal process when certain thresholds or default values are met and do not require an API trigger function to send alert notification for the end-users or IT administrators. In some embodiments, the ISMD and the independent security monitoring software program perform alerting and notification as a record keeping method to identify sensor logs and system logs. Delivery of these alerts and notifications are through normal network paths (LAN, Internet) or an APN. SQL databases have multiple sensor log and system log message numbering schemes (MSG #). Network, power, security, environment, or simple login/logout are all categorized into their respective messaging numbers from the SQL database when referencing composition of alert messages. Example: Power Loss—"PWR #101 Primary power has been lost" coupled with date/time stamp and ISMD host name/IP address designation.

In some embodiments, the alternate path network (APN) comprises a combination of data communication hardware, encapsulated into an APN module (such as APN module 212) or connected to an APN module (such as APN module 432), and APIs that utilize wireless data communication towers (e.g., cell towers) and satellite communication services (e.g., global positioning systems). In some embodiments, the APN provides one-way communication to deliver alerts/notifications to intended predefined cell phones and email addresses. In some embodiments, the APN is triggered during a loss of power as detected by all onboard power sensors or a loss of Internet connectivity, or both. In some embodiments, the APN deactivates itself automatically and returns to its normal function once the power and/or Internet is/are restored. In some embodiments, the APN also performs an electronic inventory tracking process which monitors every change of geospatial coordinates/location data (e.g., Latitude/Longitude default values) as they may occur. This is further described below in regards to GPS location tracking.

In some embodiments, the primary power sensor 446 includes the built-in UPS which enables the ISMD to seamlessly transfer power when the main power source is lost (voltage/current not detected). In some embodiments, the ISMD is constantly reading and measuring the internal VBUS, charging, and discharging conditions while limiting any sudden overflow of current from the main power source. In some embodiments, the ISMD draws power from battery when the main power source is not detected. In some embodiments, the ISMD is equipped with one or more lithium ion batteries. In some embodiments, the ISMD is equipped with one or more rechargeable batteries. When the battery or batteries are fully charged, the ISMD is capable of several hours of sustained use, even with all of its sensors running. In some embodiments, the several hours of sustained use comprises at least three hours of sustained use.

In some embodiments, the ISMD identifies changes in location by a GPS location tracking feature that compares default latitudinal and longitudinal location data to present latitude and longitude data calculated by location data received at the GPS receiver from each of at least three GPS satellites. A change in the location values beyond a threshold triggers a notification of movement of the ISMD and invocation of GPS location tracking. While the GPS location tracking allows the ISMD itself to be found when moved or stolen, another purpose of GPS location tracking is to identify and reclaim other stolen devices that are unlawfully moved (stolen) along with the ISMD. For example, a thief may intend to steal various electronic devices from a server room and, not knowing which hardware to take, includes the ISMD amount the rest of electronic devices stolen from the server room. Such inadvertent removal of a device that is capable of tracking location and reporting back to IT personnel on the GPS tracked location is likely when the ISMD is, for example, rack mounted to a cabinet with various other servers and devices. Due to the combination of UPS, APN, and API SMS and email data, it is now possible to locate the stolen or removed electronic devices. Based on the end-user's discretion, still pictures or MP4 files can also be generated, attached to an email, and be sent to the end-users.

In some embodiments, the ISMD includes a troubleshooting tool. The troubleshooting tool provides an easy and quick feature to trouble shoot problems of the ISMD, sensors, UPS, APN, communications, automation, etc. This feature is able to complete in short time periods (on the order of second, not hours). With built-in automation or API, most of the work is done by the ISMD by way of sensors, UPS, APN, SMS, and email messaging.

In some embodiments, the ISMD performs system log and sensor log record tracking. This is useful for compliance (see below) since is allows end-users to review critical moments for any sensor records collected or downtime events that occur. These moments and events can be sorted out by the day, month, or year. Login/Logout records, enabling and disabling sensors, adding, deleting, changing electronic devices and servers, and changes in threshold values are all recorded.

In some embodiments, compliance guidelines for ISO, HIPPA, GDPR, CCPA, CMMC, and other auditing records for security is satisfied by pulling the SQL database records of the Sensor and System Logs for the ISMD. Due to the data center's inability and limited capacity to grandfather compliance standards and guidelines, such as ISO 27001, ISO 9001, GDPR, and so on, the ISMD is an effective tool to use in passing a security audit. To do so for a security audit, the end-users can pull all the Sensor and System Logs indicating the events from the primary ISMD server's (1) local storage, (2) sent SMS, and (3) sent email data previously captured from specific date and time. For multi-year Log recovery, an additional USB flash storage device may be utilized.

In some embodiments, the ISMD is communicably connected to a display screen on which graphical power usage is tracked and visually output to identify wattage and amperage usage for specific dates and times. The capability to view power usage saves money and decreases downtime if the entire system has over or under power subscription which can lead to network down time.

In some embodiments, logic for the entire independent security monitoring device (ISMD) includes on/off condition of the sensors and respective subroutines constantly checking any change based from the default variable initially provided by the end-user(s). The ISMD calls various subroutines constantly and continuously until the variables and parameters are different from the original value(s). In some embodiments, the ISMD carries out all such processing, condition and threshold checking, comparisons and data monitoring by way of an independent security monitoring software program that implements the ISMD process for monitoring infrastructure systems by way of an AI and sensor-based location-independent device. This is further described below, by reference to FIGS. 5-7.

To use the ISMD and the independent security monitoring process for monitoring infrastructure systems by way of an AI and sensor-based location-independent device of the present disclosure, an IT administrator or other relevant user would deploy the independent security monitoring device in a network environment (e.g., a LAN) to solve all ISO compliance policies and procedures for a business or organization and monitor electronic devices and hardware, servers, access, software systems, and sustain power and network connectivity as needed and/or desired. As such, the ISMD is able to solve problems in which late warnings are insufficient to remedy the problem without loss or damage. For instance, a sudden high temperature/humidity event would be detected quickly by the ISMD so that remedial action can be taken by IT staff or other personnel, and it will also document this event for compliance tracking and other needs. Without early warning, electronic devices, servers, software systems, and other hardware resources could suffer irreparably. Also, other events that occur are able to be detected quickly and actions taken as fast as possible. For instance, when the door sensor is triggered, the ISMD may invoke the onboard camera to capture a video almost instantaneously with when the door sensor is triggered. Thus, by recording a video, it may be possible identify anyone accessing physical hardware or environment in real-time. While this may routinely be authorized personnel, it provides sufficient visual information in the event of theft, accidents, improper procedures, etc. The other sensors, including the earthquake/vibration sensor, allow IT personnel to proactively respond to events in near real-time, not after the fact.

Figure 5:
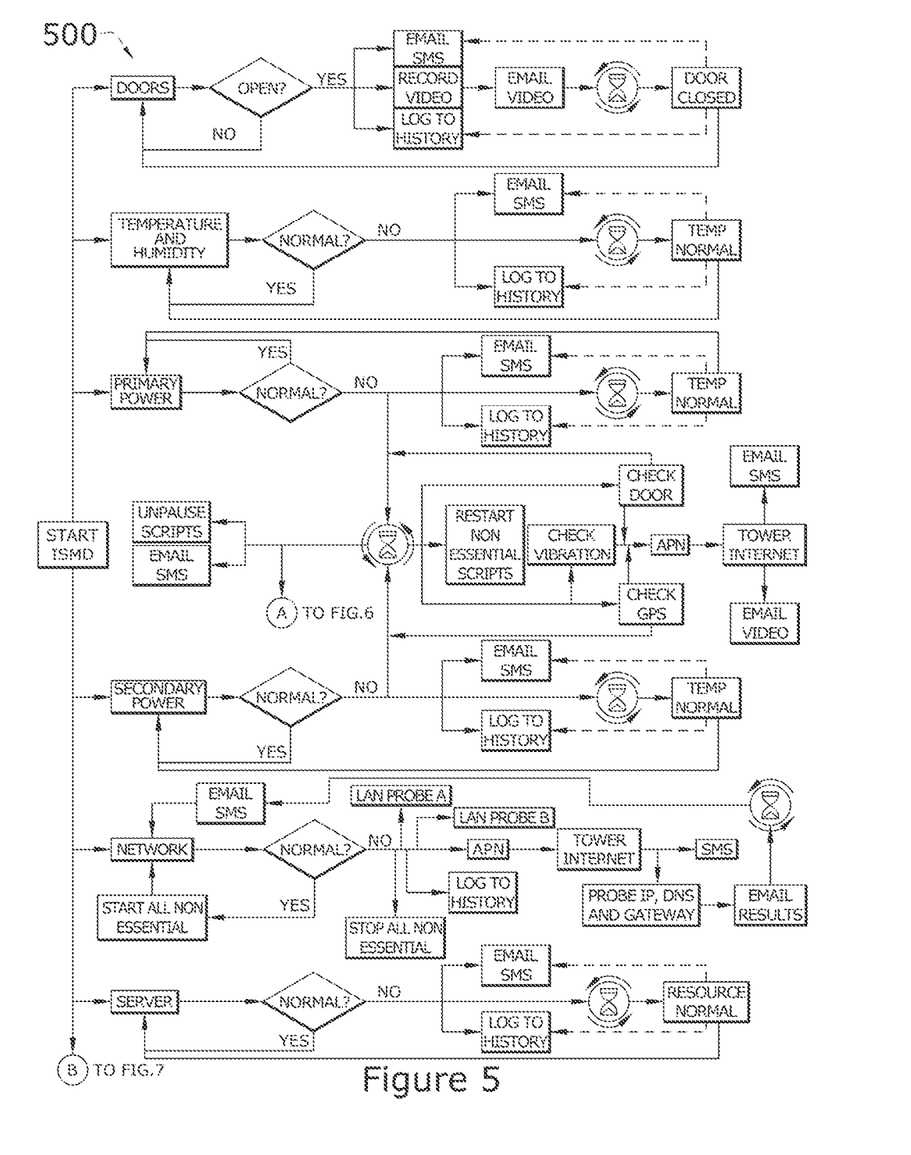
FIG. 5 conceptually illustrates an ISMD process for monitoring infrastructure systems by way of an artificial intelligence (AI) and sensor-based location-independent device in some embodiments.
Figure 6:
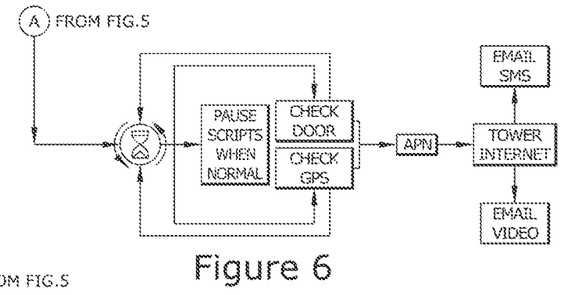
FIG. 6 conceptually illustrates a continuation of the ISMD process of FIG. 5.
Figure 7:
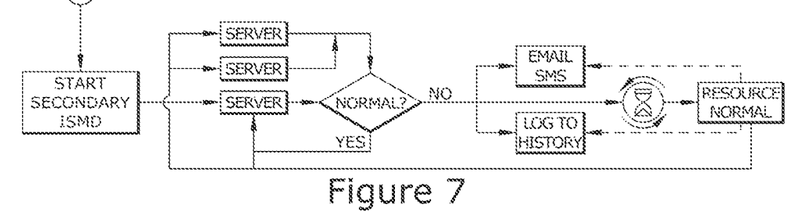
FIG. 7 conceptually illustrates a continuation of the ISMD process of FIG. 5.

By way of example, FIGS. 5-7 conceptually illustrate an ISMD process 500 for monitoring infrastructure systems by way of an artificial intelligence (AI) and sensor-based location-independent device. In some embodiments, the ISMD process 500 is performed by the independent security monitoring software program. In some embodiments, the independent security monitoring software program runs on a processing unit of the primary ISMD server within the independent security monitoring device. In some other embodiments, the independent security monitoring software program runs on a virtual processing unit of a virtual server to which the primary ISMD server connects within the independent security monitoring device. In some embodiments, the independent security monitoring software program runs as a multiple-threaded program in which multiple simultaneous threads of execution are processed in parallel by a processor with multiple cores. In some embodiments, the independent security monitoring software program runs a script for each thread of execution. In this way, monitoring across all environmental sensors, security sensors, monitored servers, and electronic devices is performed in parallel by the independent security monitoring software program.

As shown in FIGS. 5-7, the independent security monitoring software program comprises a plurality of independent security monitoring sub-processes that start when the ISMD is turned on. In some embodiments, the plurality of independent security monitoring sub-processes comprise a door monitoring sub-process, a temperature/humidity monitoring sub-process, a primary power monitoring sub-process, a secondary power monitoring sub-process, a network monitoring sub-process, a server monitoring sub-process, a start secondary ISMD sub-process, and a power failure monitoring sub-process that is triggered when both the primary power and the secondary power are not running normally.

Starting in FIG. 5, door sensor processing is shown. In some embodiments, the door monitoring sub-process is implemented as a script. The door is detected as either open or unopened (closed) via the door sensor (or via multiple door sensors for multiple doors). When the doors are not determined to be open, the script continuously runs through its loop to check to see if the door(s) remain unopened. However, when the script receives an output that one or both doors are open, it starts a parallel process that sends one email and one SMS notification to enrolled users that alerts them as to which door(s) have been opened. At the same time, the script also updates a log on the UI as to which door(s) have been opened, then saves this log to an SQL database. As part of this parallel process, and while the email and SMS notifications are sent out and the logs are recorded, the script enables a 5-10 second video (MP4) to be recorded from the camera within the ISMD. This recording is then attached to an email which is sent out to the enrolled users which they are then able to watch. Once the video has been recorded, enrolled users will receive an email and SMS notification that video has been recorded and that they will receive the video shortly. The information that the video has been recorded and sent through email is also recorded to the SQL database and is able to be seen on the user interface (UI). Once the doors are closed, another parallel process (shown by dashed arrows) starts, which sends another email and another SMS notification to the enrolled users, letting them know the door(s) is now closed, and at the same time updates the log in the UI indicating the door(s) is now closed and further saving the log to the SQL database. Furthermore, after the door is closed, the loop once again repeats itself to continue monitoring the status of the door(s).

Shown next in FIG. 5, below the door sensor processing, is temperature/humidity sensor processing. While the parallel processing of door monitoring, temperature/humidity monitoring, and other monitoring is shown in a top-down order, it is noted here that no order of processing is intended because all monitoring by the independent security monitoring software program is performed in parallel. In some embodiments, the temperature/humidity monitoring sub-process is implemented as a script. When the temperature and humidity sensors read that the (ambient) temperature and humidity are within a predetermined range, the script continuously runs through its loop to repeatedly check to see if the sensors remain within their specified range. On the other hand, when the script receives an output that the temperature and/or the humidity is outside the predetermined range, it starts a parallel process that sends one email and one SMS notification to enrolled users that alerts them as to which sensors are outside of their threshold. At the same time, the script updates a log on the UI as to which sensors are outside of their threshold, then saves that log to an SQL database. Once the sensors are within the threshold or the threshold has been updated and the (ambient) temperature and humidity sensor readings are within the predetermined range, another parallel process is started (as shown by the dashed arrows). Email and SMS notifications are sent out to enrolled users that lets them know the temperature and/or humidity are within the predetermined thresholds and the interaction is also recorded in the SQL database, which can be viewed on the UI. After this, the temperature/humidity sensor processing continues by looping back to repeatedly check the temperature and humidity.

In some embodiments, the primary power monitoring sub-process is implemented as a script. When primary power is running normally, the script continuously runs through its loop to check to see if the primary power source remains normal. When the script receives an output that the primary power is not normal, it starts a parallel process that sends out one email and one SMS notification to enrolled users that alerts them that the primary power is not normal. At the same time, the script updates a log on the UI indicating that primary power is not normal. Then the script saves that log to the SQL database. Once the primary power is back to normal, another parallel process is started (shown by dashed arrows). During this parallel process after primary power is back to normal, emails and SMS notifications are sent out to enrolled users informing them that the primary power is back to normal, and the interaction is also recorded on an SQL database, which can be viewed on the UI. The process to check the primary power continues by looping back to repeat itself.

In some embodiments, the secondary power monitoring sub-process is implemented as a script. When the secondary power source is running normally, the script continuously runs through its loop to check to see if the secondary power source remains normal. When the script receives an output that the secondary power is not normal, it starts a parallel process that sends out one email and one SMS notification to enrolled users that alerts them that the secondary power is not normal. At the same time, the script updates a log on the UI that says secondary power is not normal, then saves that log to an SQL database. Once the secondary power is back to normal, another parallel process is started (shown by dashed arrows). Emails and SMS notifications are sent out to enrolled users that lets them know that the secondary power is back to normal, and the interaction is recorded on an SQL database, which can be viewed on the UI. The process to check the secondary power now loops back to continually repeat itself.

In some embodiments, the power failure monitoring sub-process that is triggered when both the primary power and the secondary power are not running normally is implemented as a script. When the primary power and the secondary power are both not normal, the script runs this particular process (which runs in parallel with each of the parallel processes that are started when the primary power and the secondary power are each determined not to be normal). During the particular process, email and SMS notifications are sent to enrolled users to inform them that the primary power and the secondary power are both down. In addition, other steps of the particular process happen (as shown in FIG. 6, by the flow to reference mark "A"). Here, in FIG. 6, the reference mark "A" flows into a step at which the particular process pauses all scripts that were previously running, with the exception of scripts that check GPS coordinates of the ISMD and the door sensor monitoring process. Next, the APN is activated which connects it to a cellular network and enables the APN to conduct its troubleshooting protocol. Once the APN is finished it sends email and SMS notifications to enrolled users informing them about the issues relating to the primary and secondary power, and any possible countermeasures that can be enacted to correct the problem(s). Returning to FIG. 5, the particular process then continues at a step in which non-essential scripts are restarted and the vibration sensor is checked, and in parallel, the door sensor is checked and GPS coordinates checked. The particular process starts the APN when or if a primary communication path is absent, identifying a cellular communication tower (if in range) and sending email, SMS, and video email to enrolled users. At the discretion of the end-user(s), a video clip or still picture is captured and sent to enrolled users via email.

In some embodiments, the network monitoring sub-process is implemented as a script. When the network is active and running normally, the script continuously runs through its loop to check to see if the network remains active. When the script receives an output that the network is inactive, a parallel process is started which activates the APN to send out (via LTE wireless tower Internet connection) one email and one SMS notification to enrolled users alerting them that the network is inactive. At the same time, multiple local area network (LAN) probes (LAN probe "A") are sent out to all servers and network components (such as switches, router or firewalls, storages, local DNS servers, etc.) being monitored by the ISMD in an attempt to establish a successful connection. Those interactions are recorded to an SQL database and can be viewed on the UI. In order to pinpoint exactly where the network issue is happening, the APN then sends out, via the LTE tower Internet connection, multiple probes (LAN probe "B") towards the public IP address of the ISMD, the public DNS of the ISP, and the public gateway of the ISP. Combination of both LAN and WAN probe results. Then the APN sends these results to enrolled users via email. Once the network issue is resolved and the network is up or operational, all previously paused non-essential APIs are started, then enrolled users receive email and SMS notifications stating that the network connection has been restored. Those interactions are recorded to the SQL database and can be viewed on the UI. The process to check the network's status now repeats itself in continuous loop.

In some embodiments, the server monitoring sub-process is implemented as a script. When all the servers have a normal connection, status, and health, the script continuously runs through its loop to check to see if the servers remain normal. When the script receives an output that a server or multiple servers are not normal, it starts a parallel process that sends out one email and one SMS notification to enrolled users that alerts them that one or more servers do not have a normal status and/or health. At the same time, the script updates a log on the UI that says the server's status and health are not normal, then saves that log to the SQL database. Once the server is running and the status and health are back to normal, another parallel process is started (shown by dashed arrows). Emails and SMS notifications are sent out to enrolled users that lets them know that the servers are back to normal, and the interaction is recorded in the SQL database, which can also be viewed on the UI. Like all of the processes, the process to check the status and health of all servers continues to loop to repeat itself.

In some embodiments, the start secondary ISMD sub-process is implemented as a script. An example of a secondary ISMD is described above, by reference to FIG. 4. When a problem is detected with the primary ISMD, the script triggers a secondary ISMD on the network to start. This is shown by following the flow through reference mark "B" in FIG. 5, and continuing in FIG. 7 at reference mark "B". As shown, the script starts a server monitor to determine if the server (or other resource) is normal or not. When the server or other resource is not normal, a parallel process is started which sends out one email and one SMS notification to enrolled users that alerts them that the server or other resource is not normal. At the same time, the script updates a log on the UI that says the server's status and health are not normal, then saves that log to the SQL database. Once the server is running and the status and health are back to normal, another parallel process is started (shown by dashed arrows), which sends email and SMS to enrolled users to indicate the normal status and health of the server, and also recording this in the SQL database. The process then transitions to the next server (if multiple monitored servers), and repeats this process as a loop.

In some embodiments, enrolled user are required to login to access the UI and view updates and messages in the UI. During login and password flow, data security is implemented by way of two-step verification or two-step authentication, whereby a user attempting to login provides input for something the user knows and separate input for something the user has. For example, the user inputs a username and password as login credentials, after which the independent security monitoring software program checks an enrolled user database (i.e., SQL database) for contact information that corresponds to the username, and then sends a text message, an email, or makes an automated call to the user (using the contact information of the user) with a code for the user to input as the second step of the two-factor authentication scheme. Alternatively, the user may simply respond to a text message or email code to validate the user's authenticity as an enrolled user.

To make the ISMD and the independent security monitoring process for monitoring infrastructure systems by way of an AI and sensor-based location-independent device of the present disclosure, a person combines a single-board computer (at least one ISMD server), a camera, a temp/humidity sensor, an earthquake sensor, and/or any other hardware and software sensors, installing Linux OS (or other such OS) on the single-board computer, installing the door sensor at a door entrance, installing the camera as a component of the ISMD server, connecting temperature/humidity sensors, vibration sensors, and, optionally, infrared sensors, authentication security program, and/or higher capacity extra storage. Multiple single-board computers can be deployed, or multiple single-board computer hardware can be interchanged and will function using different manufacturers' hardware.

In some embodiments, wireless access is reserved only for Internet access when no physical (Ethernet) network access is available. As noted above, the APN incorporates a wireless LTE module that is able to establish a wireless connection with an LTE cellular network when a wireless communication tower is within range of the ISMD. Furthermore, the APN incorporates a GPS receiver that receives location information from GPS satellites of a global positioning system when a signal path between at least three GPS satellites the ISMD is not obstructed. In this way, the GPS receiver is able to receiver location information from the GPS satellites. Then the APN calculates a present location of the ISMD based on the location data from each of the GPS satellites. As such, the ISMD is able to self-identify when it has been moved, and provide notifications and alerts (via email and SMS over the LTE cellular network) to the IT personnel and other authorized users. GPS tracking by the ISMD is further described below, by reference to FIG. 8.

Figure 8:
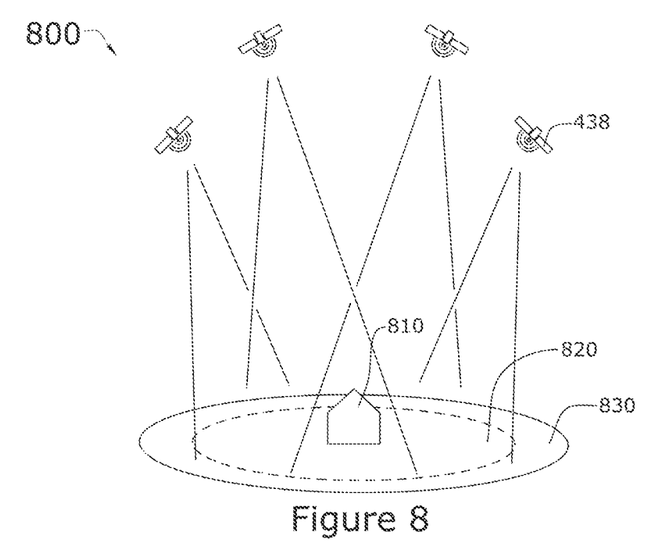
FIG. 8 conceptually illustrates a GPS tracking mechanism of the ISMD in some embodiments.

By way of example, FIG. 8 conceptually illustrates a GPS tracking mechanism 800 of the ISMD. In some embodiments, the independent security monitoring software program running on the primary ISMD server of the ISMD includes the GPS tracking mechanism as part of the automated script which is invoked for calls to check GPS and other such GPS operations. In some embodiments, the GPS tracking mechanism allows the ISMD to be a self-tracking device which tracks its own location in realtime when vibration is detected above an allowable threshold, when network connectivity is lost, and/or when primary and secondary power are not detected. In some embodiments, the GPS tracking mechanism is configured with an initial location, which is based on manual input of a physical address. In FIG. 8, for example, a physical address structure 810 is shown for the initial location of the ISMD. In some embodiments, the ISMD converts the manually input physical address in which the ISMD is housed to latitude/longitude coordinates. The latitude/longitude coordinates of the initial location of the ISMD is then stored in the SQL database, and is able to be looked up by the independent security monitoring software program in realtime when movement or vibration is detected or network connectivity is lost and power is lacking.

In some embodiments, Internet and power loss coupled with constant shaking or vibration trigger calls to check GPS or otherwise start the automated GPS tracking mechanism. Once the independent security monitoring software program breaks out of the normal sensor detection/processing loop, an initial steps is to read (or retrieve from the SQL database) and compare the default latitude/longitude coordinates (associated with the initial installation location for the ISMD) to currently calculated location that is based on location data received from three or more GPS satellites 438. When the current calculated location of the ISMD is determined to be different from the initial installation location, the GPS tracking mechanism of the independent security monitoring software program determines whether the current calculated location is within a pre-configured allowable radius of the initial installation location. For example, an IT administrator may configure the allowable radius to be 500 feet, in which case any location within a permitted circle surrounding the initial installation location up to the 500 feet radius distance would be considered within the allowable range. In FIG. 8, the permitted circle 820 is shown as a dashed line circle. Such range is programmable and can be dictated by the end-user to accommodate several criteria or considerations. Ground proximity of structures, elevation and altitude of structures, road or street layout, and nearby transportation infrastructure are variables to be considered when inputting additional distance to be considered as 'allowable' ranges. For example, if there is a train station within the 500 feet distance in which the ISMD's initial installation location (otherwise referred to as the "default" location) is located, this constitutes a shorter allowable radius due to a faster moving transportation infrastructure, and the IT administrator may change the radius to a smaller value and reduce the area covered within the permitted circle 820. Another consideration that affects the 'allowable radius' is the absence of normal street or road layout whereby foot traffic is the only way to get in and get out where the ISMD appliance was installed. This situation, for example, would possibly allow the end-user to extend allowable radius farther than 500 feet.

The most effective example of allowable radius of 500 feet will be an unattended remote location whereby thieves take their time to load all electronics devices, including the ISMD itself, into a vehicle within the allowable radius. At this point the 4-5 hours battery life of the built-in UPS and its LTE infrastructure connection to cell towers comes into play. Constant relaying of LAT/LONG values towards the enrolled users' phones and email addresses are executed. To save battery life, all non-essential APIs are disabled at this point and focus on GPS tracking mechanism programs will be the only running tasks.

The unfortunate move that the thieves will do is to power-on the ISMD appliance at the new location. If the new location is beyond the allowable radius, then the ISMD can still self-identify location and report to the appropriate personnel. In FIG. 8, the new location 830 is shown beyond the allowable radius of the permitted circle 820. This will restart all APIs looking for the sensors normal state and also charging the batteries for the UPS. At this point, a new LAT/LONG is now read and make another comparison to the default values giving opportunity for the enrolled users to track down the new location 830 of the ISMD appliance for retrieval.

Many of the above-described features and applications are implemented as software processes that are specified as a set of instructions recorded on a computer readable storage medium (also referred to as computer readable medium or machine readable medium). In particular, the independent security monitoring software program is described above as an implementation of the ISMD process and runs on the primary ISMD server of the ISMD. When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the phrase "independent security monitoring software program" and the individual terms "software", "program", "script", "application", "function", "web app" or "app", and "feature" (referred to below as "software") are meant to include automated runtime processing system software running on the ISMD, but also may include firmware residing in read-only memory or applications stored in magnetic storage, which can be read into memory for processing by a processor, such as the processor of a single board computing device or the processor of a traditional computing device, such as a server computer, a desktop computer, or a laptop computer (referred to simply as a "computer"). Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
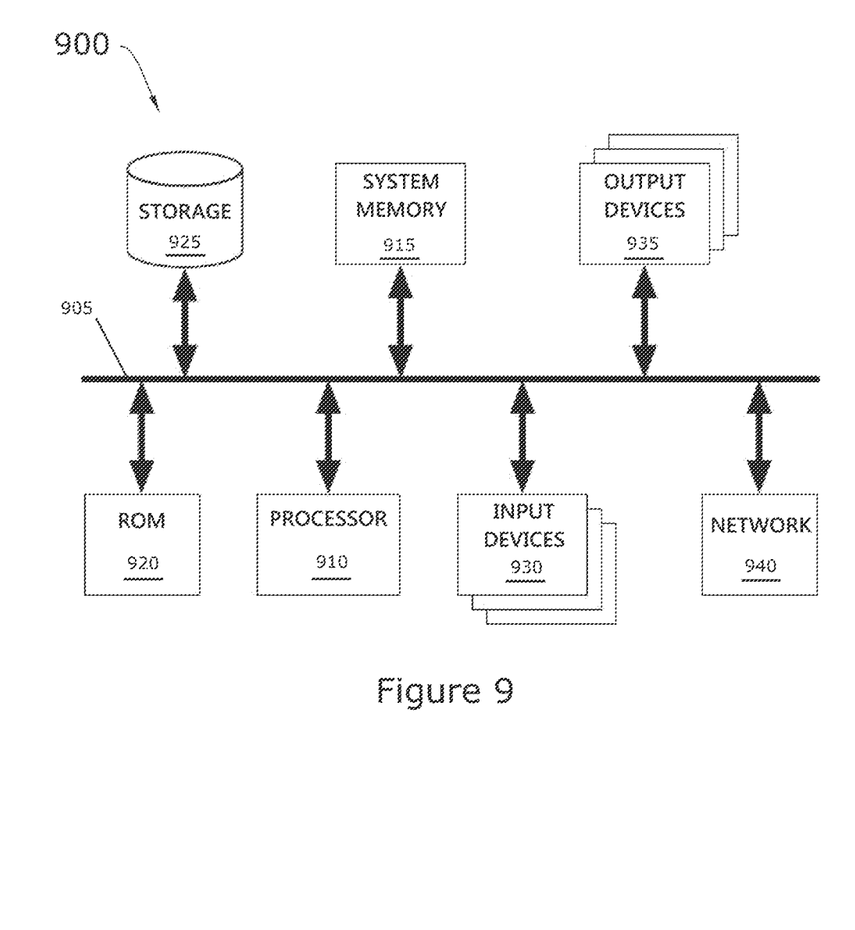
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer, such as a single board computer described above by reference to FIG. 4, a server, a tablet, a mobile device, a PDA, or any other sort of electronic device. Such an electronic system includes various types of computer readable media and interfaces for various other types of computer readable media. Electronic system 900 includes a bus 905, processing unit(s) 910, a system memory 915, a read-only memory 920, a permanent storage device 925, input devices 930, output devices 935, and a network 940.

The bus 905 collectively represents all system, peripheral, and chipset buses that communicatively connect the numerous internal devices of the electronic system 900. For instance, the bus 905 communicatively connects the processing unit(s) 910 with the read-only memory 920, the system memory 915, and the permanent storage device 925. From these various memory units, the processing unit(s) 910 retrieves instructions to execute and data to process in order to execute the processes of the invention. The processing unit(s) may be a single processor or a multi-core processor in different embodiments. The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 925.

Other embodiments use a removable storage device (such as a USB or flash drive) as the permanent storage device 925. Like the permanent storage device 925, the system memory 915 is a read-and-write memory device. However, unlike permanent storage device 925, the system memory 915 is a volatile read-and-write memory, such as a random access memory. The system memory 915 stores some of the instructions and data that the processor needs at runtime. In some embodiments, the invention's processes are stored in the system memory 915, the permanent storage device 925, and/or the read-only memory 920. For example, the various memory units include instructions for processing location data from GPS satellites and calculating current location information of the ISMD and converting the current location information to latitude and longitude coordinates, or processing sensor signals and converting to a digital value or value range that may be compared to thresholds and configured allowable ranges, values, or states. From these various memory units, the processing unit(s) 910 retrieves instructions to execute and data to process in order to execute the processes of some embodiments.

The bus 905 also connects to the input and output devices 930 and 935. The input devices enable the user to communicate information and select commands to the electronic system. The input devices 930 include alphanumeric keyboards and pointing devices (also called "cursor control devices"). The output devices 935 display images generated by the electronic system 900. The output devices 935 include printers and display devices, such as liquid crystal displays (LCD) or organic light emitting diode (OLED) displays. Some embodiments include devices such as a touchscreen that functions as both input and output devices.

Finally, as shown in FIG. 9, bus 905 also couples electronic system 900 to a network 940 through a network adapter (not shown). In this manner, the computer can be a part of a network of computers (such as a local area network ("LAN"), a wide area network ("WAN"), or an intranet), or a network of networks (such as the Internet). Any or all components of electronic system 900 may be used in conjunction with the invention. The functions or modules described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, disc media (CDs, DVDs, Blu-Ray® discs, ultra density optical discs, etc.), flash memory (e.g., SD cards, mini-SD cards, micro-SD cards, etc.), magnetic and/or solid state hard drives, and/or any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, many of the drawings conceptually illustrate automated runtime processes or methods, each with multiple steps. In each case, the specific operations of a process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. An independent security monitoring device (ISMD) that monitors infrastructure systems, said ISMD comprising:
    a primary ISMD server comprising a network sensor and an Ethernet network interface module that connects the primary ISMD server to a local area network (LAN) and the Internet;
    a plurality of security and environmental sensors that are communicably connected to the primary ISMD server and are configured to provide sensor readings to the primary ISMD server, wherein the plurality of security and environmental sensors comprise a power sensor and the network sensor, wherein sensor readings outside a normal range trigger communications to an authorized user;
    a camera that is communicably connected to the primary ISMD server and is configured to capture video clips when one or more sensor readings are outside the normal range;
    an alternate path network (APN) module that identifies an alternate data communication network when at least one of (i) a network connectivity outage is detected by the network sensor and (ii) a power outage is detected by the power sensor;
    a power adapter that provide a current of power to the primary ISMD server, the plurality of security and environmental sensors, the camera, and the APN module;
    an uninterruptible power supply (UPS) that is configured to provide battery power when the power outage is detected by the power sensor; and
    an ISMD housing that houses the primary ISMD server, the power sensor, the network sensor, the camera, the APN module, and the UPS.

2. The ISMD of claim 1, wherein the plurality of security and environmental sensors further comprise a door sensor and a vibration sensor.

3. The ISMD of claim 2, wherein the door sensor is configured to detect a door state as being one of (i) open and (ii) closed, wherein detection of the door state as open triggers the primary ISMD server to send an email alert notification and a short message service (SMS) alert to the authorized user and triggers the camera to capture a short video clip to send in an email to the authorized user.

4. The ISMD of claim 2, wherein the vibration sensor is configured to detect movement of the ISMD housing beyond a threshold amount of vibration, wherein detection of movement of the ISMD housing beyond the threshold amount of vibration triggers the APN module to read global positioning system (GPS) location data received at a GPS receiver incorporated into the APN module, wherein the GPS location data is read by the APN module and compared to a default installation location at which the ISMD housing is set to reside, wherein the GPS location data is received from at least three GPS satellites and is used to triangulate a current location of the ISMD.

5. The ISMD of claim 4 further comprising a long term evolution (LTE) wireless communication module that is incorporated into the APN module and is configured search for and connect to an available wireless communication tower nearby the triangulated current location of the ISMD when (i) the vibration sensor detects movement of the ISMD housing beyond the threshold amount of vibration, (ii) the network connectivity outage is detected by the network sensor, and (iii) the power outage is detected by the power sensor.

6. The ISMD of claim 1, wherein the plurality of security and environmental sensors further comprise a temperature sensor and a humidity sensor.

7. The ISMD of claim 6, wherein the temperature sensor is configured to detect ambient temperature outside of a pre-configured normal temperature range, wherein the humidity sensor is configured to detect ambient humidity outside of a pre-configured normal humidity range.

8. The ISMD of claim 7, wherein the primary ISMD server sends communications to the authorized user when at least one of the ambient temperature is detected outside of the pre-configured normal temperature range and the ambient humidity is detected outside of the pre-configured normal humidity range.

9. The ISMD of claim 7, wherein the temperature sensor and the humidity sensor are incorporated into a single temperature/humidity sensor.

10. The ISMD of claim 1 further comprising an automated independent security monitoring software program that is configured to monitor a plurality of servers on the LAN, wherein a first monitored server in the plurality of servers is accessible to the automated independent security monitoring software program by a first media access control (MAC) address of the first monitored server and a first internet protocol (IP) address of the first monitored server in the LAN, wherein a second monitored server in the plurality of servers is accessible to the automated independent security monitoring software program by a second MAC address of the second monitored server and a second IP address of the second monitored server in the LAN, wherein the automated independent security monitoring software program detects a first monitored server problem when the first MAC address is not identified in a lookup of the first IP address, wherein the automated independent security monitoring software program detects a second monitored server problem when the second MAC address is not identified in a lookup of the second IP address.

* * * * *